United States Patent
Muragishi et al.

(10) Patent No.: US 8,700,261 B2
(45) Date of Patent: Apr. 15, 2014

(54) ACTIVE DAMPING DEVICE, VEHICLE, METHOD FOR CONTROLLING ACTIVE DAMPING DEVICE

(75) Inventors: Yasushi Muragishi, Ise (JP); Kenta Adachi, Ise (JP)

(73) Assignee: Sinfonia Technology Co., Ltd., Tokyo (JP)

( * ) Notice: Subject to any disclaimer, the term of this patent is extended or adjusted under 35 U.S.C. 154(b) by 0 days.

(21) Appl. No.: 13/823,600

(22) PCT Filed: Sep. 9, 2011

(86) PCT No.: PCT/JP2011/070560
§ 371 (c)(1),
(2), (4) Date: Mar. 14, 2013

(87) PCT Pub. No.: WO2012/039299
PCT Pub. Date: Mar. 29, 2012

(65) Prior Publication Data
US 2013/0184935 A1 Jul. 18, 2013

(30) Foreign Application Priority Data
Sep. 24, 2010 (JP) ................................. 2010-213171

(51) Int. Cl.
*B60G 17/018* (2006.01)
*B60G 23/00* (2006.01)
*B62C 3/00* (2006.01)
*B62K 25/00* (2006.01)
*G06F 7/00* (2006.01)
*G06F 17/00* (2006.01)

(52) U.S. Cl.
USPC .......................................................... 701/37

(58) Field of Classification Search
USPC .......................................................... 701/37
See application file for complete search history.

(56) References Cited

U.S. PATENT DOCUMENTS

2010/0204881 A1  8/2010  Muragishi et al.

FOREIGN PATENT DOCUMENTS

JP   2004-346562 A    12/2004
WO   2007/129627 A1   11/2007

OTHER PUBLICATIONS

International Search Report of PCT/JP2011/070560, mailing date of Nov. 8, 2011.

*Primary Examiner* — Maceeh Anwari
(74) *Attorney, Agent, or Firm* — Westerman, Hattori, Daniels & Adrian, LLP

(57) ABSTRACT

Provided is an active damping device (X) that suppresses vibrations of an object (T) to be damped by utilizing a reaction force generated when an auxiliary mass (1) is driven by an actuator (2). The active damping device (X) includes a stiffness/damping controller (5) that multiplies the displacement and the operating speed of the actuator (2) by the stiffness gain ($k_{1a}$) and the damping gain ($c_{1a}$) and provides feedback of the multiplication result so that the natural frequency of a damping device machine system (X1) becomes equal to the excitation frequency ($\omega$) of the object (T) to be damped and the damping device machine system (X1) is controlled to have properties of counteracting the damping thereof. The stiffness/damping controller (5) is configured to adjust the stiffness gain ($k_{1a}$) and the damping gain ($c_{1a}$) according to the varying excitation frequency ($\omega$). The active damping device (X) capable of suitably suppressing the vibration corresponding to the excitation frequency component even when the excitation frequency varies can thus be provided.

3 Claims, 11 Drawing Sheets

ACTIVE DAMPING DEVICE, VEHICLE, METHOD FOR CONTROLLING ACTIVE DAMPING DEVICE

TECHNICAL FIELD

The present invention relates to an active damping device that suppresses vibrations generated in a vehicle, such as an automobile, a vehicle provided with such an active damping device, and a method for controlling such an active damping device.

BACKGROUND ART

Traditionally, a passive dynamic damper composed of an auxiliary mass such as a weight, a spring element, and a damper element is known as a damping device that suppresses vibrations. Although it has a simple configuration, the passive dynamic damper can advantageously reduce vibrations corresponding to the excitation frequency component generated in an object to be damped theoretically to zero by matching the natural frequency of the dynamic damper alone with the excitation frequency to set damping to zero.

To obtain a good damping performance with the passive dynamic damper, however, a task is required to finely adjust the spring constant and the damping coefficient, which are of the spring element and the damper element, respectively.

Accordingly, active damping devices have been invented and in practical use. The active damping devices create effects of a spring and a damper by means of an actuator, facilitating adjustment for the spring constant and the damping coefficient to provide desired stiffness and damping characteristics without the need of mechanical adjustment for the spring element itself or the damper element itself. To date, the applicant has also proposed active damping devices capable of suppressing vibrations of an object to be damped depending on an excitation frequency component of an excitation source (such as an engine) by means of a reaction force produced when an auxiliary mass is driven by a reciprocating linear actuator (Patent Literature 1, and the like).

CITATION LIST

Patent Literature

Patent Literature 1: International Publication No. WO 2007-129627

SUMMARY OF INVENTION

Technical Problem

In a conventional active damping device, by assuming (identifying) vibrations corresponding to an excitation frequency component that should be suppressed, in advance, and properly adjusting the spring constant and the damping coefficient of the damping device of its own, the vibrations corresponding to the excitation frequency component and vibrations corresponding to other frequency components close to the excitation frequency component can be smoothly suppressed as a whole.

However, if the vibrations of the object to be damped change into those corresponding to another excitation frequency component that is greatly different from the assumed (identified) excitation frequency as, for example, the driving condition of the excitation source (such as an engine) varies, the vibrations cannot effectively be suppressed.

The primary object of the invention, which has been made in view of the above problems, is to provide an active damping device capable of suitably suppressing vibrations of an object to be damped depending on an excitation frequency component even when the excitation frequency component varies, a method for controlling the same, and even a vehicle provided with such an active damping device.

Solution to Problem

The present invention relates to an active damping device including: an auxiliary mass; and an actuator that drives the auxiliary mass to generate a spring force and a damping force while the auxiliary mass is driven, wherein a reaction force generated when the auxiliary mass is driven by the actuator is used to suppress vibrations of an object to be damped depending on an excitation frequency component of an excitation source. The term "object to be damped" used herein may refer to anything that vibrates in response to the excitation frequency component of the excitation source whether or not the object is equipment. The "object to be damped" may also refer to "entire equipment" or "a specific region or part of equipment." The active damping device of the invention may particularly be advantageous when the "excitation source" is, but not limited to, anything the driving condition (operating condition) of which may significantly vary, for example, a rotating machine such as an engine, a motor, and a generator.

The active damping device according to the invention includes a stiffness/damping controller that feeds back a stiffness/damping control signal composed of a detected or estimated displacement of the actuator multiplied by a stiffness gain and a detected or estimated operating speed of the actuator multiplied by a damping gain to change stiffness and damping characteristics of the active damping device of its own in response to variation in the excitation frequency. The stiffness/damping controller adjusts the stiffness gain and the damping gain in synchronization with the excitation frequency based on excitation frequency information indicative of the excitation frequency that varies depending on a driving condition of the excitation source so that a natural frequency of the active damping device can be matched with the excitation frequency of the object to be damped and damping of the active damping device can be cancelled out.

In the active damping device of the invention, the displacement or the operating speed of the actuator may be either a value directly detected by detection means such as a displacement sensor and a speed sensor, or a value estimated (calculated) from another value (either a detected or estimated value) through a predetermined computing. The "excitation frequency information" in the present invention encompasses all information from which the excitation frequency can be calculated, such as the excitation frequency itself, the operating condition of the excitation source (rotational or driving pulses), and specifications (the number of cylinders, the number of ignited cylinders, engine type, or the like, if the excitation source is an engine).

In the present invention, the stiffness/damping controller for adjusting stiffness and damping characteristics of the active damping device of its own adjusts the stiffness gain and the damping gain in synchronization with the excitation frequency component and feeds back the stiffness gain multiplied by the displacement of the actuator and the damping gain multiplied by the operating speed of the actuator as a stiffness/damping control signal. Accordingly, when the actuator is driven based on the stiffness/damping control signal, the natural frequency of the active damping device is equalized to the excitation frequency and the damping is close to zero, so that vibrations corresponding to the excitation frequency generated in the object to be damped can be brought close to zero and suitably suppressed. Particularly when the excitation frequency significantly varies as the operating condition of the excitation source varies, by adjusting the stiffness gain and the damping gain in connection with the varying excitation frequency based on the excitation frequency information and feeding back the stiffness/damping control signal determined on the basis of the adjusted stiffness and damping gains, the natural frequency of the active damping device can be matched with the varying excitation frequency and the damping can be cancelled out, and the active damping device thereby has an excellent damping effect on vibrations corresponding to the varying excitation frequency component.

As described above, since the active damping device of the invention adopts a novel damping control in that the device changes stiffness and damping characteristics in response to variation in the excitation frequency when it varies, the active damping device has a good damping effect even when a proper damping effect cannot be exerted by a damping control with an invariable natural frequency, such as that of a conventional damping device, that is, even on vibrations corresponding to the excitation frequency component that significantly varies from a previously assumed (identified) excitation frequency.

Further, a vehicle according to the present invention includes an active damping device of a configuration as described above. As described above, the active damping device of the invention may particularly be advantageous when an engine the driving condition (operating condition) of which may significantly vary is the excitation source, and a vehicle provided with such an active damping device may therefore offer a comfortable ride for the driver or passengers since the active damping device has an excellent damping effect even on vibrations corresponding to a varying excitation frequency component.

Still further, a method for controlling an active damping device according to the invention is a method for suppressing vibrations of an object to be damped depending on an excitation frequency component of an excitation source, the device including an auxiliary mass and an actuator that drives the auxiliary mass to generate a spring force and a damping force while the auxiliary mass is driven, the method using a reaction force generated when the auxiliary mass is driven by the actuator, wherein in a stiffness/damping controlling step in which a stiffness/damping control signal composed of a detected or estimated displacement of the actuator multiplied by a stiffness gain and a detected or estimated operating speed of the actuator multiplied by a damping gain is fed back to change stiffness and damping characteristics of the active damping device in response to variation in the excitation frequency, the stiffness gain and the damping gain are adjusted in synchronization with the excitation frequency based on excitation frequency information indicative of the excitation frequency that varies depending on a driving condition of the excitation source so that a natural frequency of the active damping device can be matched with the excitation frequency of the object to be damped and damping of the active damping device can be cancelled out.

According to such a method for controlling an active damping device, since the stiffness gain and the damping gain are adjusted in synchronization with the excitation frequency to change stiffness and damping characteristics, vibrations corresponding to the excitation frequency component can be reduced even when the excitation frequency varies, similarly to the advantages of the active damping device as described above.

Advantageous Effects of Invention

According to the present invention, there are provided an active damping device that, even when the excitation frequency varies depending on the operating condition or the like of the excitation source, can suitably suppress vibrations corresponding to the varying excitation frequency component by adjusting the stiffness gain and the damping gain that are determinative of stiffness and damping characteristics in synchronization with the excitation frequency, a method for controlling the same, and even a vehicle provided with an active damping device that can suitably suppress vibrations corresponding to the varying excitation frequency component.

DESCRIPTION OF EMBODIMENT

An embodiment of the present invention will now be described with reference to drawings.

Figure 1:
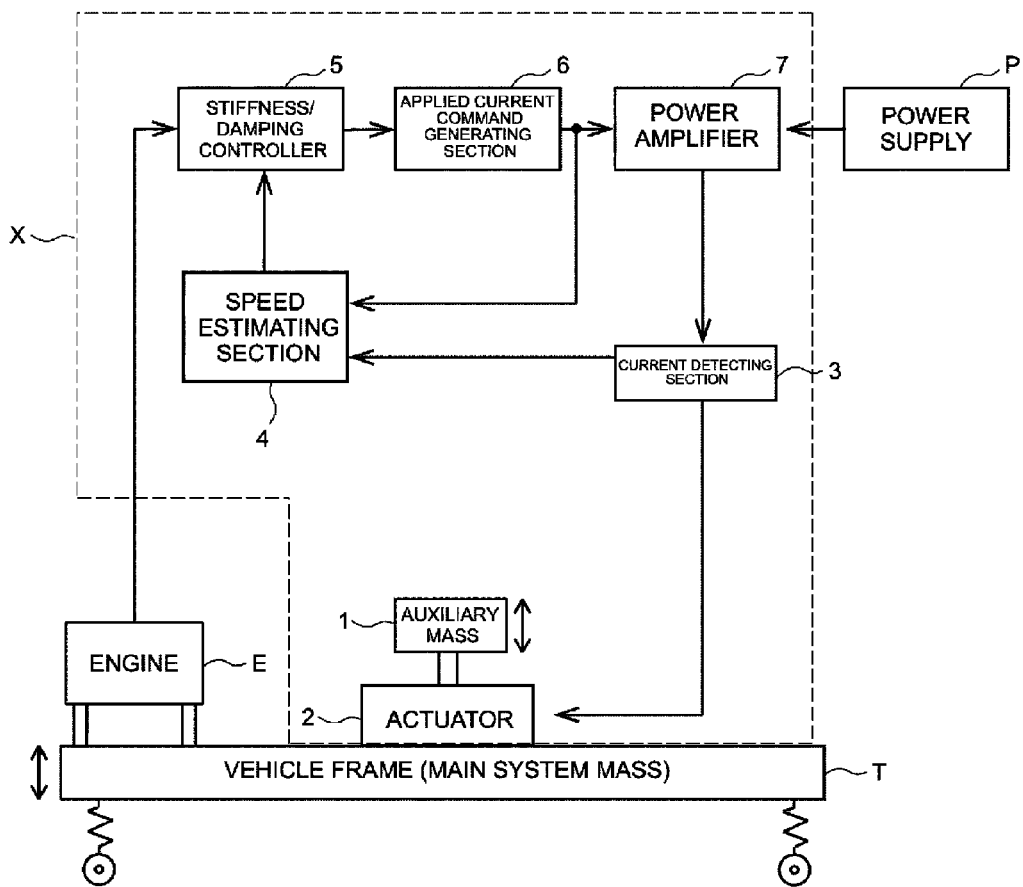
FIG. 1 is a functional block diagram of an active damping device according to an embodiment of the present invention.
Figure 2:
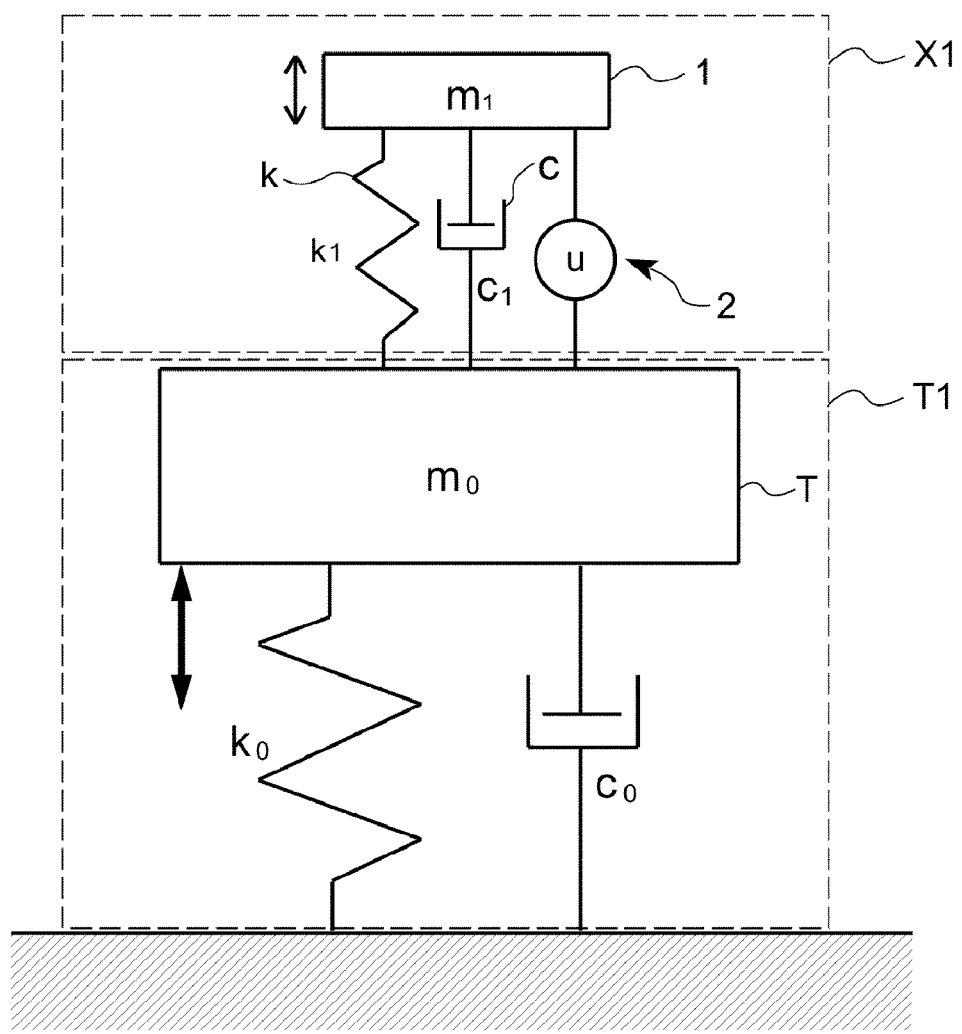
FIG. 2 is a diagram for illustrating the operating principle of the active damping device according to the embodiment attached to an object to be damped.

As shown in FIGS. 1 and 2, an active damping device X according to the embodiment, which may also be referred to as "damping device X," includes an auxiliary mass 1 and an actuator 2 that drives the auxiliary mass 1, and suppresses vibrations of an object to be damped T by means of a reaction force produced when the auxiliary mass 1 is driven by the actuator 2.

When such a damping device X is fixed (attached) to the object to be damped T and the object to be damped T vibrates and the auxiliary mass 1 and the actuator 2 are driven, a vibration system of the object to be damped T hereinafter referred to as "object main system T1") and another vibration system of the damping device X (hereinafter referred to as "damping device machine system X1") are formed as shown in FIG. 2, which is a schematic diagram of the state represented by a model, and in FIG. 3, which is a block diagram of the state, and the damping device X causes the actuator 2 to move the auxiliary mass 1 in a direction in which vibrations of the object to be damped T are cancelled out, thereby exerting a damping effect. Such a damping device X is also referred to as an active dynamic damper. Note that "$m_0$", "$k_0$", and "$c_0$" in FIGS. 2 and 3 denote a mass of the object to be damped T (main system mass), a spring constant of the object main system T1, and a damping coefficient of the object main system T1, respectively, and "$m_1$", "$k_1$", and "$c_1$" denote the auxiliary mass 1, a spring constant of the damping device machine system X1, and a damping coefficient of the damping device machine system X1, respectively. The reference numeral 2 in FIG. 3 particularly indicates an electric system in the actuator.

In the embodiment, the damping device X is attached to a body frame T of, for example, a vehicle and the actuator 2 is caused to generate a vibration damping force (excitation force) so as to be able to suppress vertical (gravity-wise) vibrations generated in the body frame T. Note that the vehicle is provided with an engine E, and the engine E is the source of vibrations generated in the body frame T (excitation source, vibration source). Note also that, besides the body frame T, there are a number of members and parts that vibrate when the engine E is driven, such as a seat, the vicinity of an engine mount, the vicinity of a radiator, the underpart of a rear load-carrying platform, and the underpart of a trunk, to all of which the damping device X according to the embodiment can be attached to provide an adequate damping effect.

The auxiliary mass 1 is a weight, for example, and is supported (held) by a spring element k and a damping element c, as shown in FIG. 2. In the embodiment, members constituting the actuator 2 (a reciprocating motor M, as described later) function as the spring element k or the damping element c.

As shown in FIG. 1, in addition to the auxiliary mass 1 and the actuator 2, the damping device X according to the embodiment includes a current detecting section 3 that detects a current (driving current) for driving the actuator 2, a speed estimating section 4 that estimates an operating speed (travel speed) of the actuator 2 based on a current value $I_a$ output from the current detecting section 3 and a current command to a power amplifier 7 and like, a stiffness/damping controller 5 that feeds back an integrated value of an estimated speed value output from the speed estimating section 4 multiplied by a stiffness gain $k_{1a}$ and an estimated speed value multiplied by a damping gain $c_{1a}$ as a stiffness/damping control signal to control stiffness and damping characteristics of the damping device machine system X1 into desired characteristics, an applied current command generating section 6 that determines and outputs a command value for a current to be applied to the actuator 2 corresponding to a force to be generated by the actuator 2 based on the stiffness/damping control signal output from the stiffness/damping controller 5 and the like, and the power amplifier 7 that supplies to the actuator 2 a current used to drive the actuator 2 corresponding to an output value (current command value) from the applied current command generating section 6.

In the active damping device X of the embodiment, a linear actuator that reciprocates the auxiliary mass 1 is used as the actuator 2. While a voice coil motor may be used as the linear actuator, a reciprocating motor M using an electromagnetic force is used in the embodiment.

Figure 4:
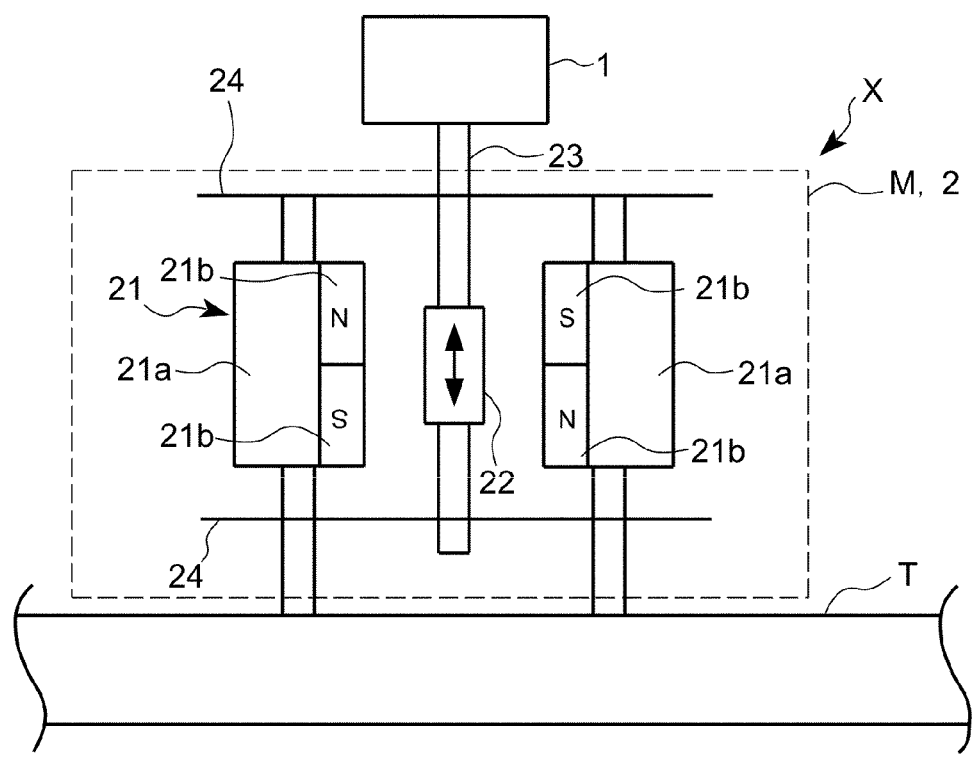
FIG. 4 is a schematic diagram of an actuator in the embodiment.
Figure 5:
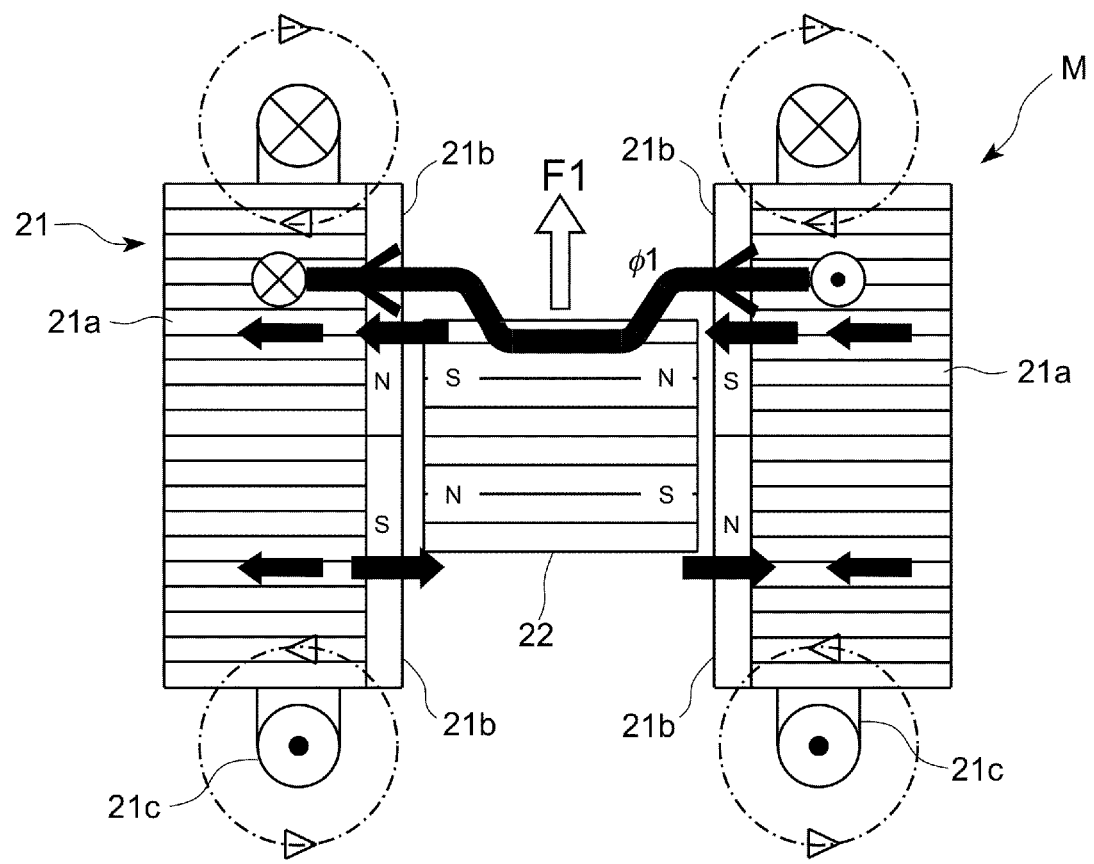
FIG. 5 is a diagram for illustrating the operating principle of the actuator.
Figure 6:
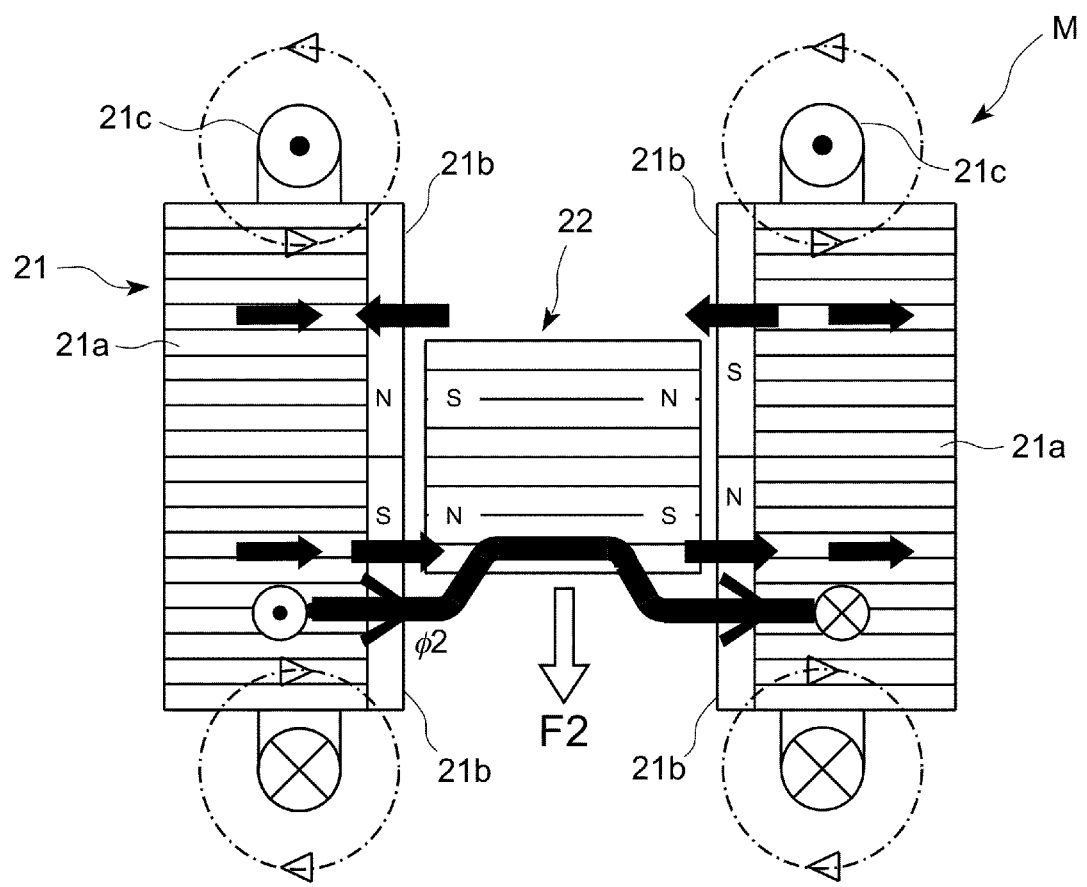
FIG. 6 is a diagram for illustrating the operating principle of the actuator.

As shown in FIGS. 4 to 6, the reciprocating motor M includes a stator 21 fixed to the object to be damped T (body frame T), a moving part 22 reciprocally movable with respect to the stator 21, a shaft 23 disposed concentrically with the stator 21 and the moving part 22 and reciprocally movable integrally with the moving part 22, and plate springs 24 that elastically deform themselves to support the moving part 22 and the shaft 23 with respect to the stator 21 in a reciprocally movable manner. The stator 21 includes a laminated core 21a made of ring steel plates laminated in a longitudinal (axial) direction of the shaft 23 and formed in a cylindrical shape that has a space inside where the moving part 22 is allowed to move, permanent magnets 21b disposed in regions of the laminated core 21a that can face the moving part 22, and a coil 21c wound around predetermined portions of the laminated core 21a (see FIG. 5). The permanent magnets 21b here are arranged such that axially adjacent magnet poles and magnet poles on the opposite sides of the moving part 22 are different from each other. The moving part 22 is also made of laminated ring steel plates and is fixed to the shaft 23 by suitable means. In the embodiment, the moving part 22 and auxiliary mass 1 are joined via the shaft 23 and the stator 21 is fixed to the object to be damped T such that the direction of vibrations of the object to be damped T that should be suppressed coincide with the direction (thrust direction) in which the moving part 22 reciprocates (see FIG. 4).

When current flows through the coil 21c in a predetermined direction (positive direction), the coil 21c, the permanent magnets 21b, and the like interact with each other to form a magnetic flux path shown by an arrow φ1 in FIG. 5 and the moving part 22 moves in the opposite direction to gravity (upward, in the direction of an arrow F1). When current flows through the coil 21c in the opposite direction to the predetermined direction (negative direction), a magnetic flux path shown by an arrow φ2 in FIG. 6 is formed and the moving part 22 moves in the direction of gravity (downward, in the direction of an arrow F2). The directions F1 and F2 of thrust acting on the moving part 22 depend on the direction of current flowing through the coil 21c. Consequently, by causing current to flow through the coil 21c alternately in positive and negative directions, the moving part 22 can be linearly driven back and forth (vibrated) along the axial direction. This causes the auxiliary mass 1, which is held by the plate springs 24 via the shaft 23, to reciprocate.

The amount of thrust experienced by the moving part 22 is proportional to the amount of current flowing through the coil 21c, and the damping device X of the embodiment is configured to control acceleration of the moving part 22 and the auxiliary mass 1 based on a current command value output from the applied current command generating section 6 to the power amplifier 7 so as to reduce vibrations of the object to be damped T. Note that in the linear actuator 2 shown in FIG. 4, rather than supporting and allowing the shaft 23 to slide in a reciprocally movable manner, the plate springs 24 hold the moving part 22 at two points on the top and bottom sides of the shaft 23 and support it so as to be reciprocally movable in the axial direction by elastically deforming themselves. The moving part 22 is not subject to wear and sliding friction, and the accuracy of supporting the shaft 23 will not be affected even in a long time use. High reliability can therefore be achieved and no power consumption loss due to sliding friction leads to an improved performance.

The current detecting section 3 is constructed with, for example, a current sensor and detects a current $I_a$ supplied from the power amplifier 7 to the actuator 2. Specifically, as shown in FIG. 3, using the fact that the power amplifier 7 outputs to the actuator 2 a command voltage obtained by multiplying an output value (current command value) from the applied current command generating section 6 by a predetermined power amplifier gain $G_{PA}*$, and the fact that a current supplied is corresponding to the output value (command voltage) from the power amplifier 7 input to the coil 21c of the actuator 2 (L, R and s represent an inductance, a resistance, and a Laplace operator (differential operator), respectively), i.e. the current being the command voltage multiplied by a thrust constant $K_T$ of the actuator 2, the current detecting section 3 detects the current $I_a$ supplied to the actuator 2 and outputs the detected value $I_a{}^*$ to the speed estimating section 4. The damping device X of the embodiment is also provided with a current feedback controlling section 8 that returns the current value $I_a{}^*$ detected by the current detecting section 3 multiplied by a predetermined feedback gain $G_c$ (current feedback command value) to the input side of the power amplifier 7. With the current feedback control, a sufficient responsiveness can be achieved even at a high frequency.

Figure 7:
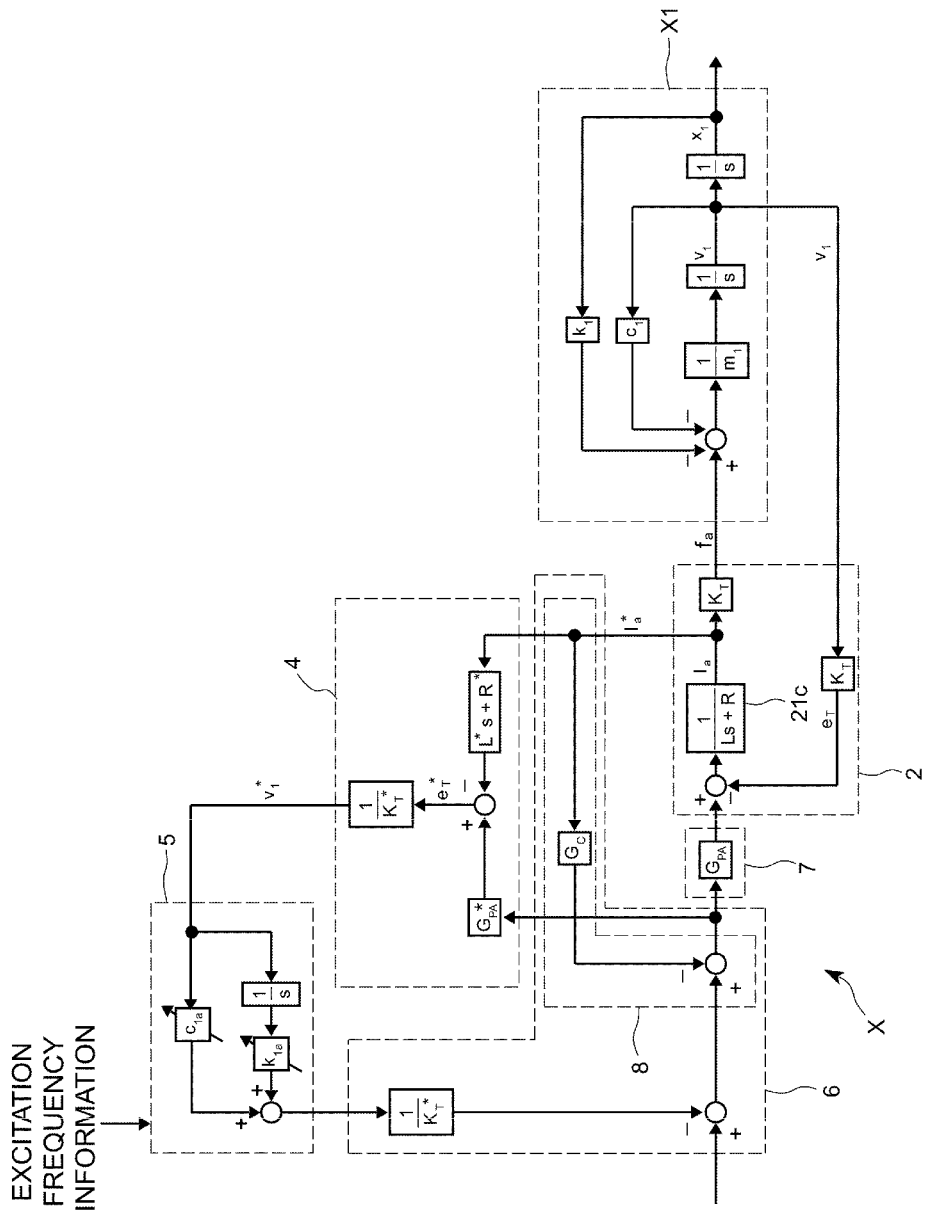
FIG. 7 is a block diagram of the active damping device according to the embodiment alone.

As shown in FIG. 7, which is a block diagram of the damping device X alone, the speed estimating section 4 estimates an operating speed $V_1{}^*$ of the actuator 2 based on an induced electromotive force $e_T{}^*$. In the embodiment, the induced electromotive force $e_T{}^*$ is estimated from the coil of the actuator 2 and the command voltage, and the induced electromotive force $e_T{}^*$ is divided by a thrust constant $K_T{}^*$ of the actuator 2 to estimate the operating speed $V_1{}^*$ of the actuator 2. The command voltage can be determined by multiplying the command value input to the power amplifier 7 by the power amplifier gain $G_{PA}{}^*$. Note that a voltage detecting section may separately be provided for detecting a terminal voltage of the actuator 2, and a voltage value detected by the voltage detecting section may be used to estimate the induced electromotive force $e_T{}^*$. Meanwhile, a coil terminal voltage of the actuator 2 can be determined by multiplying a current supplied to the actuator 2 (in the embodiment, the current value $I_a{}^*$ detected by the current detecting section 3) by "$L^*s+R^*$," the inverse of the coil 21c. The speed estimating section 4 then outputs the estimated speed value $v_1{}^*$ thus estimated to the stiffness/damping controller 5.

Note that another speed estimating section 4 may be used, which is configured to determine an induced electromotive force from the command voltage and the terminal voltage of the actuator 2 and estimate the operating speed of the actuator 2 (moving part 22) from the induced electromotive force.

As shown in FIG. 7, the stiffness/damping controller 5 feeds back, as a stiffness/damping control signal, a displacement x (displacement $x_1$ of the actuator 2), which is an integrated value of the estimated speed value $v_1{}^*$ output from the speed estimating section 4, multiplied by the stiffness gain $k_{1a}$ and the estimated speed value $v_1{}^*$ multiplied by the damping gain $c_{1a}$ to adjust stiffness and damping characteristics of the damping device X. Specifically, the stiffness/damping controller 5 matches a natural frequency of the damping device machine system X1 with the excitation frequency ω of the object to be damped T in synchronization with the excitation frequency ω based on excitation frequency information input from the engine E or an engine control unit, which is not shown. The stiffness/damping controller 5 also adjusts the stiffness gain $k_{1a}$ and the damping gain $c_{1a}$ so as to be able to cancel out damping of the damping device machine system X1 and outputs a stiffness/damping control signal that is based on the adjusted stiffness gain $k_{1a}$ and damping gain $c_{1a}$ to the applied current command generating section 6. While the excitation frequency information input to the stiffness/damping controller 5 may be the excitation frequency ω itself, it may also be information from which the excitation frequency ω can be determined, such as a fundamental excitation frequency component of the engine E, namely the number of ignitions of the engine (ignition cycle), and information including the higher order components (a factor of 2, 3, or larger) of the fundamental component. In the latter case, the processing of determining the excitation frequency ω from the excitation frequency information through a suitable computing or the like may be performed by the stiffness/damping controller 5 or may be performed upstream (on the engine E side) of the stiffness/damping controller 5. Note that alternatively or in addition to the ignition cycle of the engine E, the excitation frequency information includes information about one, some, or all of rotational pulses, ignition pulses, the number of cylinders, the number of ignited cylinders, and the engine type of the engine E, and the excitation frequency ω may be determined from the information.

Using the fact that the natural frequency of the damping device machine system X1 can be determined by $\sqrt{(k_1/m_1)}$, the stiffness/damping controller 5 of the embodiment determines the stiffness gain $k_{1a}$ according to Formula 1 below.

$$\sqrt{\frac{k_1 + k_{1a}}{m1}} = \omega \qquad \text{[Formula 1]}$$

In Formula 1, $k_1$, $k_{1a}$, $m_1$, and ω denote a spring constant, a stiffness gain, an auxiliary mass, and an excitation frequency of the damping device machine system X1, respectively.

The stiffness/damping controller 5 of the embodiment also determines the damping gain $c_{1a}$ according to Formula 2 below.

$$c_{1a} \leq 2\zeta\sqrt{m_1(k_1+k_{1a})} - c_1 \qquad \text{[Formula 2]}$$

In Formula 2, $c_1$, $c_{1a}$, ζ, $m_1$, $k_1$, and $k_{1a}$, denote a damping coefficient, a damping gain, a damping ratio, an auxiliary mass, and spring constant, a stiffness gain, and an excitation frequency of the damping device machine system X1, respectively.

Then, in the damping device X of the embodiment, sum of the stiffness gain $k_{1a}$ adjusted based on the excitation frequency ω by the stiffness/damping controller 5 multiplied by the displacement x of the damping device machine system X1 and the damping gain $c_{1a}$ multiplied by the operating speed of the damping device machine system X1 (actuator 2) is output as a thrust command value indicating thrust to be generated by the actuator 2, which corresponds to the "stiffness/damping control signal" and may also be referred to as a "force command value."

The applied current command generating section 6 generates a command value for a current applied to the actuator 2 based on a stiffness/damping control current command value, which is the force command value output from the stiffness/damping controller 5 divided by the thrust constant $K_T{}^*$ of the actuator 2, and on a current supplied from a power supply P. The applied current command generating section 6 then outputs the generated current command value to the power amplifier 7. Here, as shown in FIGS. 2 and 7, the current feedback controlling section 8 may be considered as part of the applied current command generating section 6. Specifically, in determining a command value for a current to be applied to the actuator 2, the applied current command generating section 6 is configured to reflect the current feedback command value output from the current feedback controlling section 8 and output the reflected current command value to the power amplifier 7.

The power amplifier 7 supplies a current to the linear actuator 2 depending on a force to be generated in the actuator 2. In the embodiment, the power amplifier 7 multiplies the current command value output from the applied current command generating section 6 by a predetermined power amplifier gain $G_{P4}$, and outputs the resultant value of multiplication, or a command voltage, to the actuator 2.

The operation and damping method of the damping device X according to the embodiment, and effects will now be described with reference to FIGS. 3, 7, and 8.

As shown in FIG. 7, when the moving part 22 and the auxiliary mass 1 are driven by thrust $f_a$ acting on the actuator 2 without the damping device machine system X1 attached to the object to be damped T, a force proportional to the operating speed $V_1$ (the thrust $f_a$ divided by a mass $m_1$ (auxiliary mass 1)) of the damping device machine system X1, which is specifically a force corresponding to the operating speed $V_1$ of the damping device machine system X1 multiplied by the damping coefficient $c_1$, is generated as a damping force, and also a force proportional to the displacement $x_1$ (integrated value of speed) of the damping device machine system X1, which is specifically a force corresponding to the displacement $x_1$ of the damping device machine system X1 multiplied by the spring constant $k_1$, is generated as a spring force. The spring force and the damping force serve to reduce (lower) the thrust $f_a$ of the actuator 2.

In the object main system T1, when vibrations corresponding to the excitation frequency component (excitation force $f_d$) are generated without the damping device X attached thereto, a spring force proportional to a displacement $x_0$ of the object main system T1 (the displacement $x_0$ of the object main system T1 multiplied by a spring constant $k_0$) is generated and also a damping force proportional to a operating speed $v_0$ of the object main system T1 (the operating speed $v_0$ of the object main system T1 multiplied by a damping coefficient $c_0$) is generated. The spring force and the damping force serve to reduce (lower) the vibration $f_d$ of the actuator 2.

Figure 3:
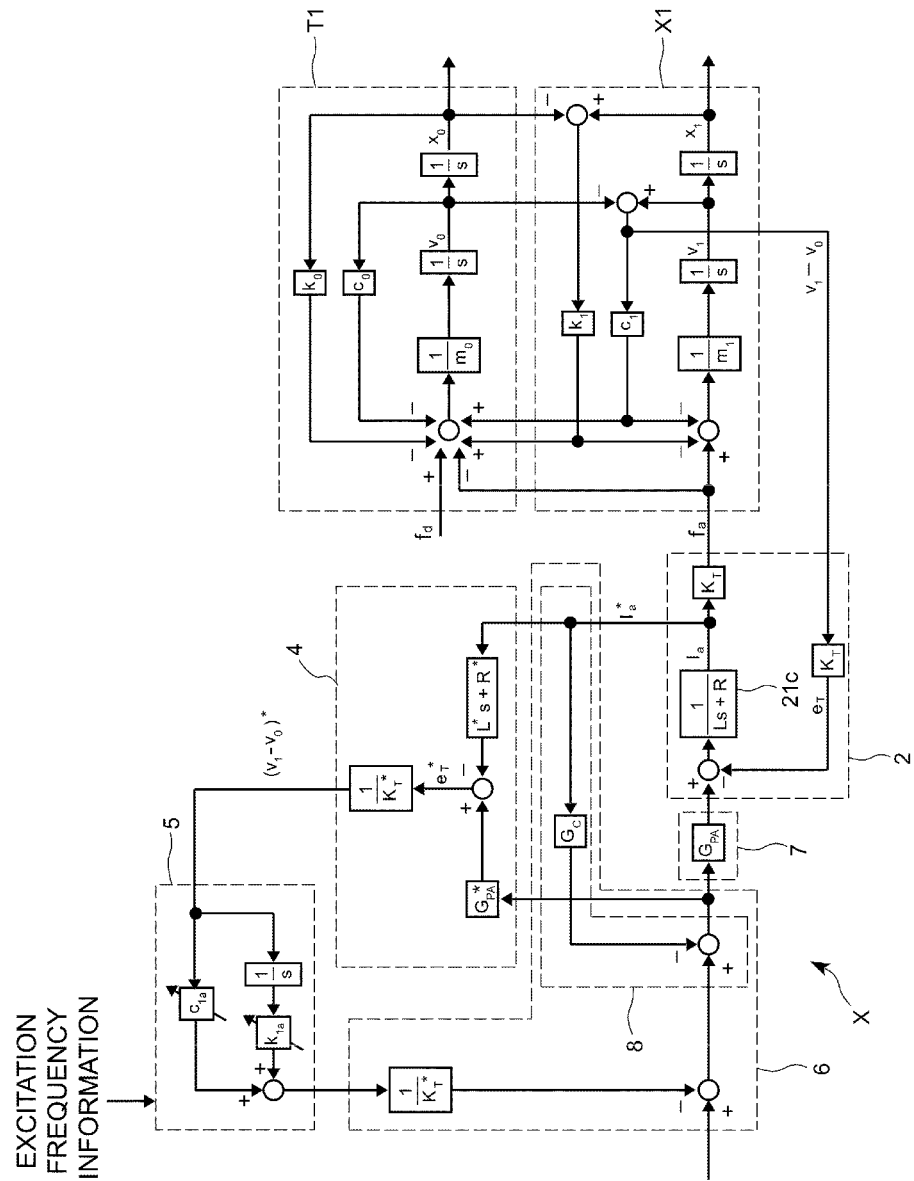
FIG. 3 is a block diagram of the active damping device attached to an object to be damped.

As shown in FIG. 3, with the damping device X of the embodiment attached to such object to be damped T, the thrust $f_a$ of the actuator 2 and the spring and damping forces resulting from the thrust $f_a$ of the actuator 2 also act on the object to be damped T.

At this point, if the natural frequency of the damping device X (damping device machine system X1), which is dependent on the auxiliary mass 1 and the spring constant $k_1$ of the damping device X (damping device machine system X1), is equal to the excitation frequency ω and the damping coefficient $c_1$ of the damping device X (damping device machine system X1) is zero, vibrations of the object to be damped T can theoretically be reduced to zero.

However, when the damping device X is applied with the natural frequency matched with a particular excitation frequency ω so as to be able to suppress vibrations corresponding to a particular excitation frequency component, only the vibrations corresponding to the particular excitation frequency component can be reduced and if the excitation frequency ω significantly varies due to the driving condition of the engine E, for example, a damping effect degrades with respect to vibrations corresponding to the varying excitation frequency component.

Accordingly, in the damping device X of the embodiment, the stiffness gain $k_{1a}$ is adjusted according to the above Formula 1 and the damping gain $c_{1a}$ is adjusted according to Formula 2 by the stiffness/damping controller 5 so that, even when the excitation frequency ω varies, the natural frequency of the damping device X (damping device machine system X1) is equalized to the excitation frequency ω in response to the varying excitation frequency ω and damping gain $c_1$ of the damping device X (damping device machine system X1) is brought close to zero.

Specifically, in the damping device X of the embodiment, while the auxiliary mass 1 is reciprocally driven by the actuator 2 in a powered state (yes at S1 of FIG. 8), a current supplied from the power amplifier 7 to the actuator 2 is detected by the current detecting section 3, which outputs the detected value $I_a^*$ to the speed estimating section 4 (current detecting step S2). Then, in the damping device X of the embodiment, the induced electromotive force $e_T^*$ is estimated from a command voltage and an output value (current value $I_a^*$) of the current detecting section 3 in the speed estimating section 4, and the operating speed of the actuator 2 is estimated by dividing the induced electromotive force $e_T^*$ by a thrust constant $K_T^*$ of the actuator 2 (operating speed estimating step S3).

At this point, the induced electromotive force $e_T$ (the operating speed of the damping device machine system X1 divided by the thrust constant $K_T$ of the actuator 2) is generated in the actuator 2 depending on the operating speed of the damping device machine system X1, and the terminal voltage of the actuator 2 is reduced accordingly. With the damping device X attached to the object to be damped T, as shown in FIG. 3, the operating speed $v_1$ of the damping device machine system X1 also includes the operating speed $v_0$ of the object main system T1. Accordingly, the induced electromotive force $e_T$ actually generated in the actuator 2 is a value corresponding to the result of subtracting the operating speed $V_0$ of the object main system T1 from the operating speed $v_1$ of the damping device machine system X1 ($v_1-v_0$). Since the speed estimating section 4 of the embodiment (operating speed estimating step S3) is configured to estimate the operating speed of the actuator 2 alone based on the induced electromotive force $e_T^*$, which is equivalent to the induced electromotive force $e_T$, the value estimated in the speed estimating section 4 and output to the stiffness/damping controller 5 corresponds to the result of subtracting the operating speed $V_0$ of the object main system T1 from the operating speed $v_1$ of the damping device machine system X1 ($v_1-v_0$).

Subsequently, in the damping device X of the embodiment, based on excitation frequency information input from the engine E or an engine control unit (ECU), which is not shown, to the stiffness/damping controller 5, the stiffness gain $k_{1a}$ is adjusted based on the above Formula 1 and the damping gain $c_{1a}$ is adjusted based on the above Formula 2 by the stiffness/damping controller 5 to provide stiffness and damping characteristics of the damping device X such that the excitation frequency ω is matched with the natural frequency of the damping device machine system X1 and the damping gain $c_1$ of the damping device machine system X1 is cancelled out, and the adjusted stiffness gain $k_{1a}$ multiplied by an integrated value of an output value from the speed estimating section 4 (operating speed of the actuator 2, $v_1-v_0$) and the adjusted damping gain $c_{1a}$ multiplied by the output value from the speed estimating section 4 (operating speed of the actuator 2, $v_1-v_0$) are output to the applied current command generating section 6 as a force command value (stiffness/damping control step S4).

Next, in the damping device X of the embodiment, based on the stiffness/damping control current command value indicative of the force command value output from the stiffness/damping controller 5 divided by the thrust constant $K_T^*$ of the actuator 2, a supply-current-to-power amplifier command value is generated by the applied current command generating section 6 (supplied current command generating step S5). In the embodiment, the supply-current-to-power amplifier command value and the current feedback command value are associated with each other and a resultant associated current command value is output to the power amplifier 7 by the applied current command generating section 6 (supplied current command generating step S5). Then, in the damping device X of the embodiment, a command voltage resulting from the current command value multiplied by a predetermined power amplifier gain $G_{PA}$ is output to the actuator 2 by the power amplifier 7 (voltage command outputting step S6). In this way, thrust $f_a$ resulting from a current corresponding to the command voltage multiplied by the thrust constant $K_T$ acts on the moving part 22 of the actuator 2. The reciprocating moving part 22 that is subject to the thrust $f_a$ drives the auxiliary mass 1 to reciprocate and the reaction force can be used to reduce vibrations of the object to be damped T. In this case, since the spring constant $k_1$ and the damping coefficient $c_1$ of the damping device machine system X1 are adjusted according to the stiffness gain $k_{1a}$ and the damping gain $c_{1a}$ adjusted by the stiffness/damping controller 5, respectively, the moving part 22 of the actuator 2 and the auxiliary mass 1 (damping device machine system X1) vibrate at a natural frequency matched with the excitation frequency ω, and since damping is brought close to zero, the vibration of the object to be damped T can also be brought close to zero, resulting in a good damping effect.

Figure 8:
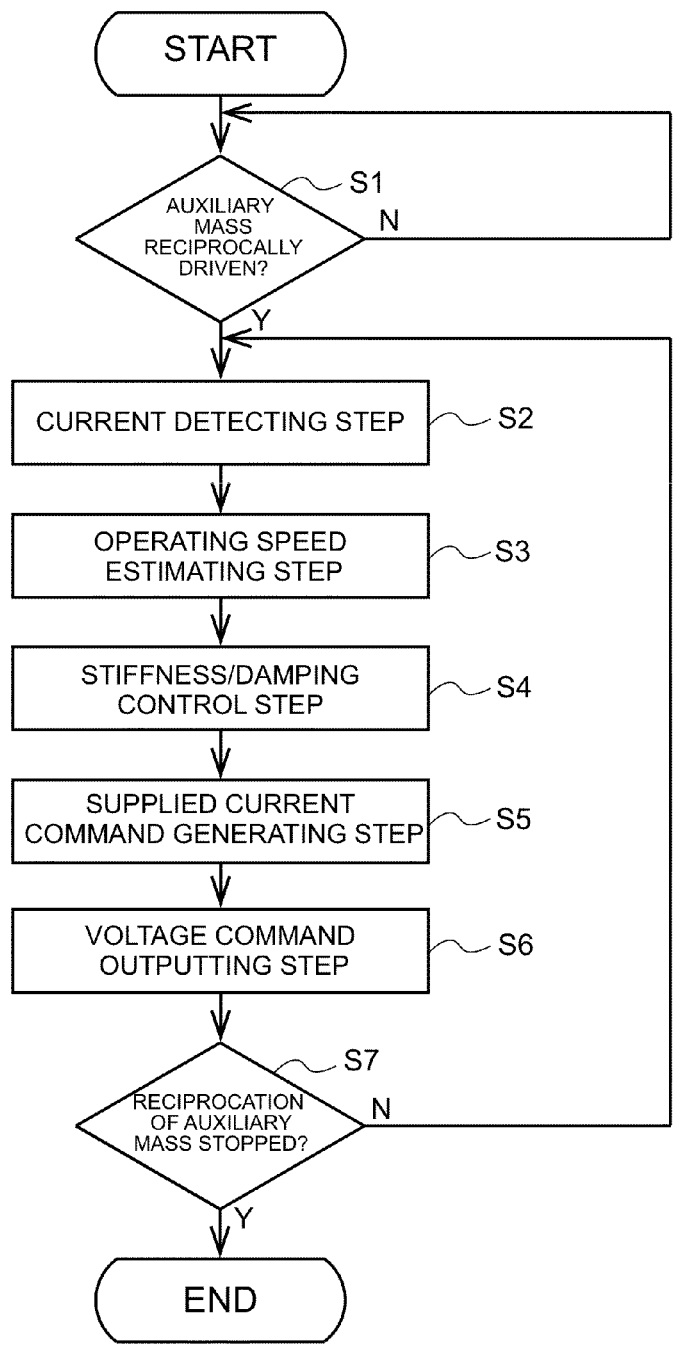
FIG. 8 is a flow chart of the active damping device according to the embodiment.

The damping device X of the embodiment terminates the processes described above when the reciprocation of the auxiliary mass 1 by the actuator 2 stops (yes at S7 of FIG. 8), and continuously repeats the processes from the current detecting step S2 to the voltage command outputting step S6 while the reciprocation of the auxiliary mass 1 by the actuator 2 continues (no at S7 of FIG. 8). In this way, vibrations corresponding to the excitation frequency component that vary depending on a driving condition of the engine E can effectively be suppressed. Exemplary cases where the reciprocation of the auxiliary mass 1 by the actuator 2 stops here include when the power from the power supply P to the actuator 2 breaks, when there is no vibration to be suppressed in a powered state, or when the damping mode is not selected.

In this way, the damping device X of the embodiment is configured to allow the stiffness/damping controller 5 to adjust the stiffness gain $k_{1a}$ and damping gain $c_{1a}$ while following the excitation frequency ω, and the adjustment of the stiffness gain $k_{1a}$ and damping gain $c_{1a}$ are performed so that the excitation frequency ω is matched with the natural frequency of the damping device machine system X1 and the damping $c_1$ of the damping device machine system X1 is brought close to zero. Accordingly, even when the excitation frequency ω varies, vibrations corresponding to the excitation frequency component can always be brought close to zero, and a good damping effect is exerted.

In particular, the damping device X of the embodiment controls the adjustment of the stiffness gain $k_{1a}$ and damping gain $c_{1a}$ based on the excitation frequency information input from the engine E or an engine control unit to the stiffness/damping controller 5. This eliminates tasks of previously acquiring vibration control characteristics of the object to be damped T prior to attaching the damping device X to the object to be damped T, and setting stiffness and damping characteristics of the damping device X according to the vibration control characteristics, allowing simplification of tasks for introducing the device. In addition, once the damping device X is attached to the object to be damped T, a variety of vibrations corresponding to the excitation frequency component can suitably be suppressed, providing excellent versatility.

Further, the damping device X of the embodiment is configured to estimate the operating speed of the actuator 2 (damping device machine system X1) by the operating speed estimating section 4 based on the current value $I_a$ detected by the current detecting section 3 or the command voltage input to the power amplifier 7. This eliminates various sensors (displacement x sensor, speed sensor, and acceleration sensor) for detecting a relative value (displacement x, speed, and acceleration) of the auxiliary mass 1 with respect to the stator 21 of the actuator 2, allowing cost reduction. In addition, the embodiment adopts the current feedback control so as to be able to achieve a suitable responsiveness even at a high frequency and is configured to estimate the operating speed of the actuator 2 (damping device machine system X1) by means of the current detecting section 3, which is indispensable for the current feedback control, allowing components to be suitably shared.

Figure 9:
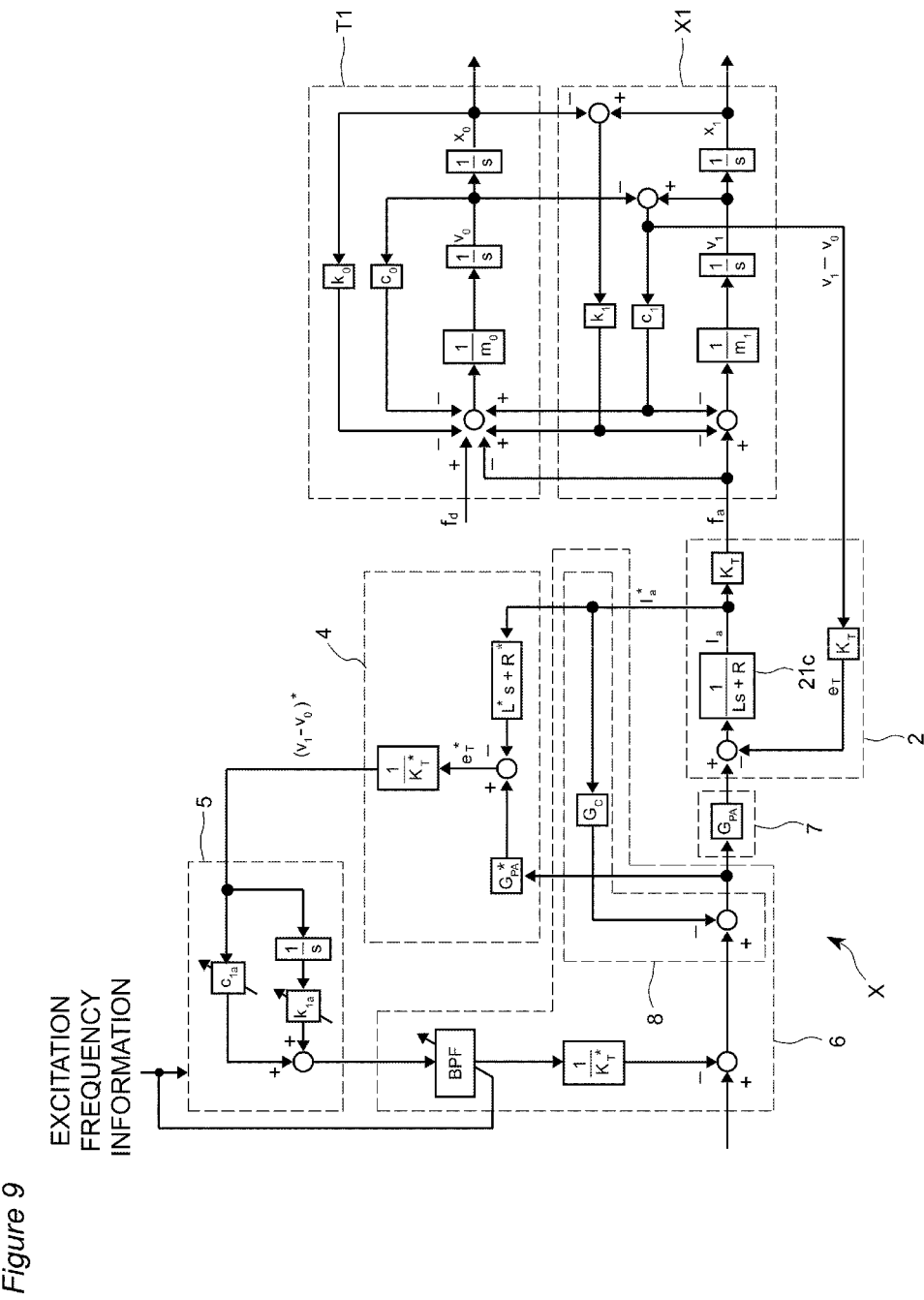
FIG. 9 is a diagram corresponding to FIG. 3 illustrating a variation of the active damping device according to the embodiment.

The present invention is not limited to the embodiment described above. For example, as shown in FIG. 9, the damping device may have a bandpass filter BPF inserted (located) in place for suppressing other signal components than a natural frequency component. In particular, when damping of the damping device machine system X1 is adjusted to zero, vibration characteristics degrade in low at a high frequency bands of the natural frequency of the damping device machine system X1. Any excitation frequency component present in these bands may amplify vibrations of the object to be damped T and lead to performance degradation in bands except the natural frequency. In order to avoid such inconvenience, a bandpass filter BPF may be inserted (located) in place. Such a bandpass filter BPF may be used to remove other signals than an excitation frequency component from the stiffness/damping control signal (stiffness/damping control current command value), so that it is possible to prevent control from affecting bands except the excitation frequency component. The bandpass filter BPF only needs to be adjusted in response to the excitation frequency ω.

Figure 10:
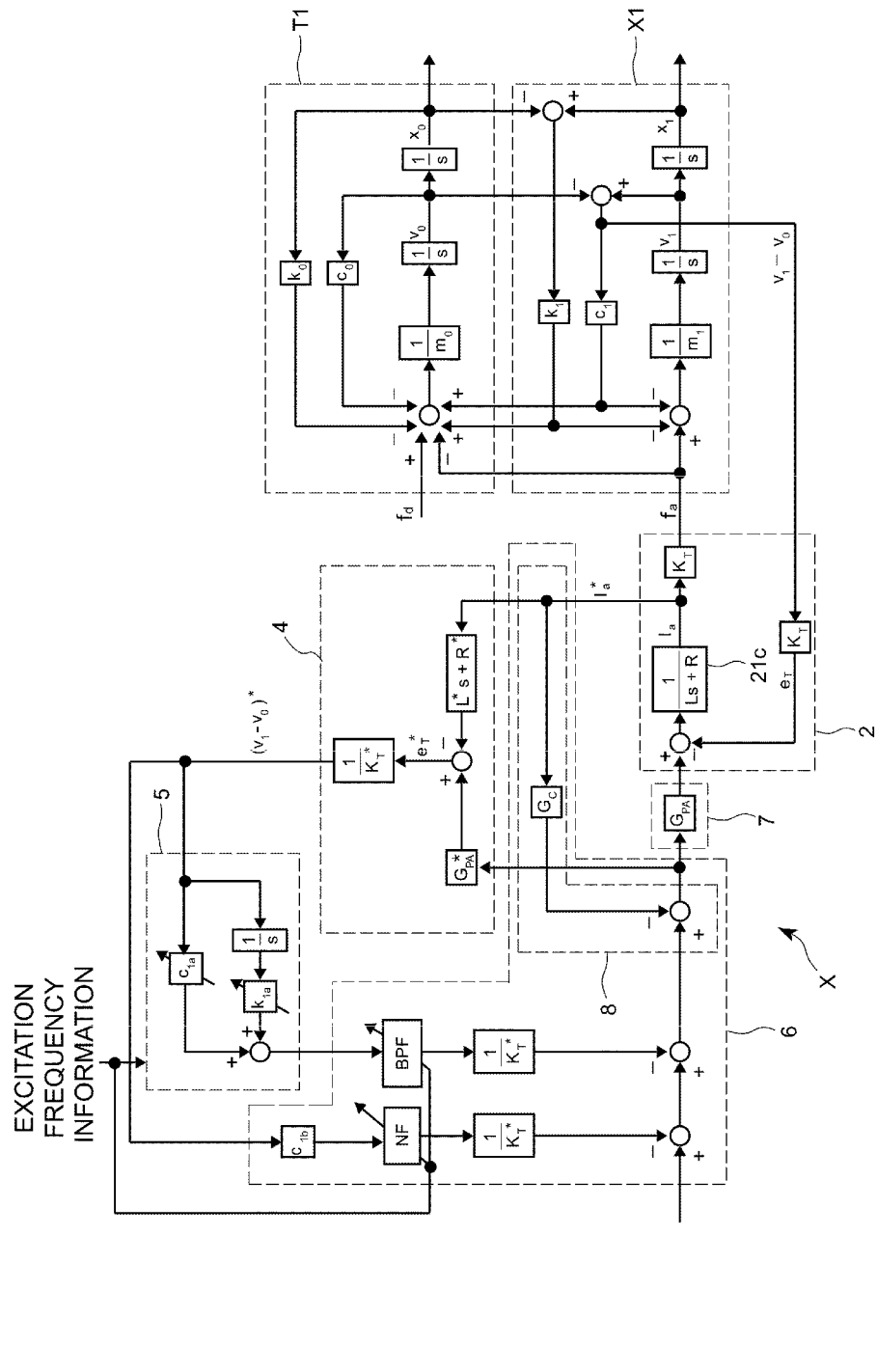
FIG. 10 is a diagram corresponding to FIG. 3 illustrating a variation of the active damping device according to the embodiment.

In order to avoid damping performance degradation due to damping control on bands except the frequency (excitation frequency ω) of the object to be damped, a notch filter NF may also be provided in addition to the bandpass filter BPF, as shown in FIG. 10. A loop for feeding back a speed value passing through the notch filter NF, which removes signals of the natural frequency component by multiplying an output value from the speed estimating section 4 (operating speed of the actuator 2, $v_1-v_0$) by a predetermined damping gain $c_{1b}$, may be added so that damping control can act on bands except a natural frequency component defined by the damping device machine system X1. In this way, performance degradation in bands except the excitation frequency component can be avoided while suppressing the excitation frequency component.

Figure 11:
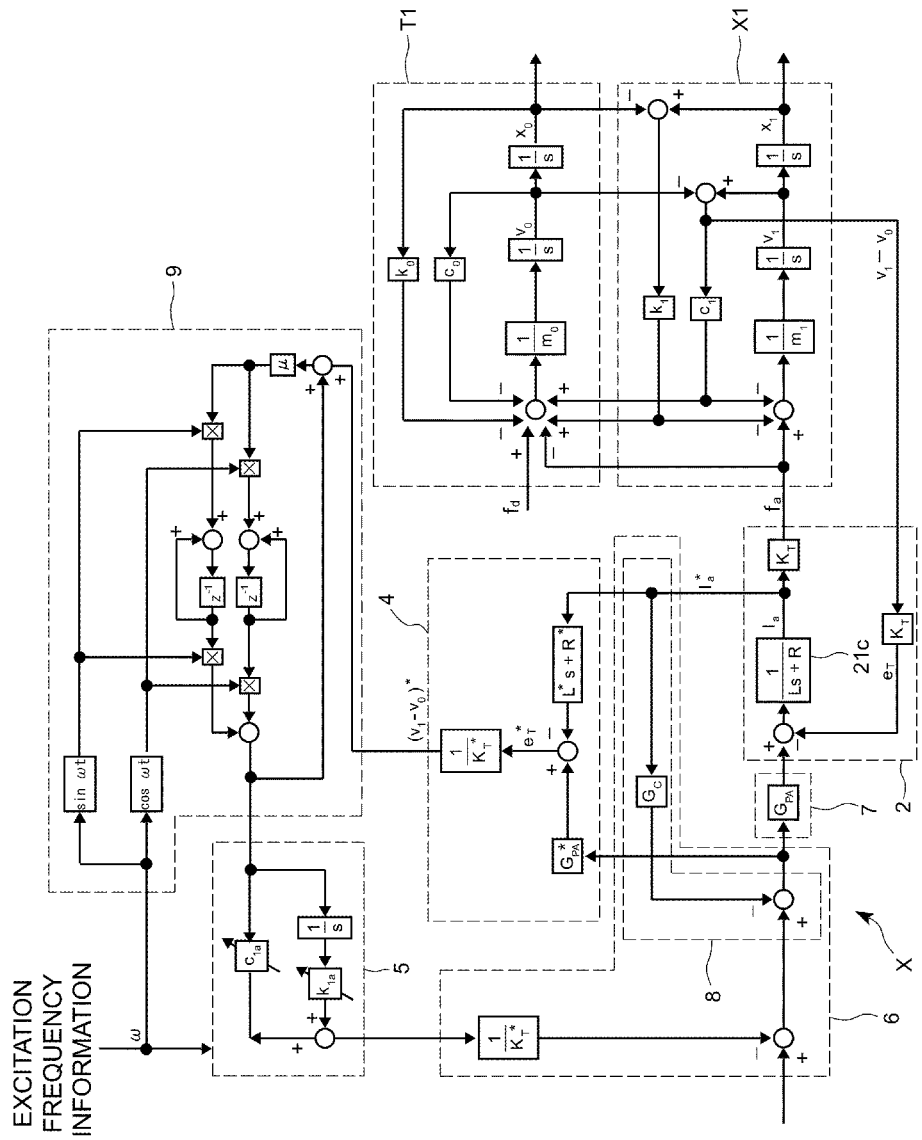
FIG. 11 is a diagram corresponding to FIG. 3 illustrating a variation of the active damping device according to the embodiment.

In order to avoid damping performance degradation due to damping control on bands except the frequency (excitation frequency ω) of the object to be damped, an output value from the speed estimating section 4 (operating speed of the actuator 2, $v_1-v_0$) may be allowed to pass through a delayed harmonic synthesizer least mean square (DXHS) filter to extract only the excitation frequency component, as shown in FIG. 11. Adjusting the stiffness gain $k_{1a}$ and damping gain $c_{1a}$ based on the extracted excitation frequency component makes it possible to extract only signals of the excitation frequency component for controlling stiffness and damping, and it is possible to prevent control from adversely affecting bands except the excitation frequency component. Note that μ, x, $z^{-1}$, and t in FIG. 11 denote a step size parameter, multiplication, a unit delay operator, and time, respectively.

While an engine has been described as an excitation source in the embodiment described above, the damping device may also be configured to suppress vibrations of an object to be damped that has any other excitation source than the engine, such as a motor, a pump, and a generator. In this case, rotational or driving pulse signals of equipment that is an excitation source can be used as excitation frequency information, and an excitation frequency calculated from such pulse signals may be input to the stiffness/damping controller.

While the embodiment described above has shown an aspect that estimates an operating speed of an actuator (damping device machine system) based on an induced electromotive force generated in the actuator, it may also include at least one of sensors (displacement sensor, speed sensor, and acceleration sensor) for detecting a relative value (displacement, speed, and acceleration) of an auxiliary mass with respect to a stator of the actuator and may be configured to detect or estimate the operating speed of the actuator (damping device machine system) based on an output value from the sensor. Further, a displacement of the actuator (damping device machine system) by which a stiffness gain is multiplied in the stiffness/damping controller (stiffness/damping control step) may be directly detected by a displacement sensor, or may be estimated (calculated) through a predetermined computing based on a sensing value (detected value) from a speed sensor or an acceleration sensor. Similarly, an operating speed of the actuator (damping device machine system) by which a damping gain is multiplied in the stiffness/damping controller (stiffness/damping control step) may be directly detected by a speed sensor, or may be estimated (calculated) through a predetermined computing based on a sensing value (detected value) from a displacement sensor or an acceleration sensor.

The damping device may not necessarily adopt the current feedback control.

The active damping device of the present invention may also be mounted on any other movable object than an automobile (such as an aircraft and a ship) and vibrations that may be generated in a predetermined area of each movable object can suitably be prevented and suppressed by the active damping device.

Further, any specific configurations of other portions are not limited to the embodiment described above, and various modifications may be made within the true spirit of the invention.

REFERENCE SIGNS LIST

1 . . . auxiliary mass
2 . . . actuator (linear actuator, reciprocating motor)
$c_{1a}$ . . . damping gain
$k_{1a}$ . . . stiffness gain
T . . . object to be damped (vehicle frame)
X . . . active damping device
ω . . . excitation frequency

The invention claimed is:

1. An active damping device for suppressing vibrations of an object to be damped depending on an excitation frequency component of an excitation source, the active damping device comprising:
   an auxiliary mass;
   an actuator that drives the auxiliary mass to generate a spring force and a damping force while the auxiliary mass is driven, and the active damping device using a reaction force generated when the auxiliary mass is driven by the actuator, and
   a stiffness and damping controller, wherein the stiffness and damping controller feeds back a stiffness and damping control signal composed of a detected or estimated displacement of the actuator multiplied by a stiffness gain and a detected or estimated operating speed of the actuator multiplied by a damping gain to change stiffness and damping characteristics of the active damping device in response to variation in the excitation frequency, and
   wherein the stiffness and damping controller adjusts the stiffness gain and the damping gain in synchronization with the excitation frequency based on excitation frequency information indicative of the excitation frequency that varies depending on a driving condition of the excitation source so that a natural frequency of the active damping device can be matched with the excitation frequency of the object to be damped and damping of the active damping device can be cancelled out.

2. A vehicle comprising an active damping device for suppressing vibrations of an object to be damped depending on an excitation frequency component of an excitation source, the active damping device comprising:
   an auxiliary mass;
   an actuator that drives the auxiliary mass to generate a spring force and a damping force while the auxiliary mass is driven, and the active damping device using a reaction force generated when the auxiliary mass is driven by the actuator, and
   a stiffness and damping controller, wherein the stiffness and damping controller feeds back a stiffness and damping control signal composed of a detected or estimated displacement of the actuator multiplied by a stiffness gain and a detected or estimated operating speed of the actuator multiplied by a damping gain to change stiffness and damping characteristics of the active damping device in response to variation in the excitation frequency, and
   wherein the stiffness and damping controller adjusts the stiffness gain and the damping gain in synchronization with the excitation frequency based on excitation frequency information indicative of the excitation frequency that varies depending on a driving condition of the excitation source so that a natural frequency of the active damping device can be matched with the excitation frequency of the object to be damped and damping of the active damping device can be cancelled out.

3. A method for controlling an active damping device suppressing vibrations of an object to be damped depending on an excitation frequency component of an excitation source, the active damping device including an auxiliary mass and an actuator that drives the auxiliary mass to generate a spring force and a damping force while the auxiliary mass is driven, the method using a reaction force generated when the auxiliary mass is driven by the actuator,
   wherein in a stiffness and damping controlling step in which a stiffness and damping control signal composed of a detected or estimated displacement of the actuator multiplied by a stiffness gain and a detected or estimated operating speed of the actuator multiplied by a damping gain is fed back to change stiffness and damping characteristics of the active damping device in response to variation in the excitation frequency, the stiffness gain and the damping gain are adjusted in synchronization with the excitation frequency based on excitation frequency information indicative of the excitation frequency that varies depending on a driving condition of the excitation source so that a natural frequency of the active damping device can be matched with the excitation frequency of the object to be damped and damping of the active damping device can be cancelled out.

* * * * *